United States Patent
Izquierdo et al.

(10) Patent No.: US 9,487,660 B2
(45) Date of Patent: Nov. 8, 2016

(54) WIRE-LIKE SPRAY MATERIAL, FUNCTIONAL LAYER WHICH CAN BE PRODUCED THEREWITH AND PROCESS FOR COATING A SUBSTRATE WITH A SPRAY MATERIAL

(75) Inventors: Patrick Izquierdo, Ulm (DE); Rainer Joos, Kernen (DE); Tobias Lux, Stuttgart (DE); Eyuep Akin Oezdeniz, Walheim am Neckar (DE)

(73) Assignee: Daimler AG, Stuttgart (DE)

( * ) Notice: Subject to any disclaimer, the term of this patent is extended or adjusted under 35 U.S.C. 154(b) by 821 days.

(21) Appl. No.: 13/697,081

(22) PCT Filed: May 3, 2011

(86) PCT No.: PCT/EP2011/002178
§ 371 (c)(1),
(2), (4) Date: Nov. 28, 2012

(87) PCT Pub. No.: WO2011/147526
PCT Pub. Date: Dec. 1, 2011

(65) Prior Publication Data
US 2013/0089682 A1    Apr. 11, 2013

(30) Foreign Application Priority Data
May 22, 2010    (DE) .................. 10 2010 021 300

(51) Int. Cl.
| | |
|---|---|
| *C22C 38/44* | (2006.01) |
| *C22C 38/46* | (2006.01) |
| *C23C 4/131* | (2016.01) |
| *C09D 1/00* | (2006.01) |
| *B23K 35/30* | (2006.01) |

(Continued)

(52) U.S. Cl.
CPC ............ *C09D 1/00* (2013.01); *B23K 35/3086* (2013.01); *C22C 38/04* (2013.01); *C22C 38/42* (2013.01); *C22C 38/44* (2013.01); *C22C 38/52* (2013.01); *C23C 4/08* (2013.01); *C23C 4/131* (2016.01); *C23C 4/18* (2013.01)

(58) Field of Classification Search
CPC .................................................. B23K 35/3086
See application file for complete search history.

(56) References Cited

U.S. PATENT DOCUMENTS

| | | |
|---|---|---|
| 6,548,195 B1 | 4/2003 | Barbezat |
| 6,578,539 B2 | 6/2003 | Barbezat |

(Continued)

FOREIGN PATENT DOCUMENTS

| | | |
|---|---|---|
| CN | 1876881 A | 12/2006 |
| CN | 101574691 A | 11/2009 |

(Continued)

OTHER PUBLICATIONS

Office Action issued Feb. 27, 2014, in Chinese Patent Application No. 201180025401.7 (with English language translation).

(Continued)

*Primary Examiner* — Joel Horning
(74) *Attorney, Agent, or Firm* — Patent Central LLC; Stephan A. Pendorf

(57) ABSTRACT

A wire-like spray material (4) based on an iron for electric arc wire spraying and also a functional layer (2) which can be produced therewith on a substrate (1). The functional layer (2) has good corrosion resistance towards diesel fuel having a high sulphur content.

8 Claims, 1 Drawing Sheet

(51) Int. Cl.
  *C23C 4/08* (2016.01)
  *C23C 4/18* (2006.01)
  *C22C 38/04* (2006.01)
  *C22C 38/42* (2006.01)
  *C22C 38/52* (2006.01)

(56) References Cited

U.S. PATENT DOCUMENTS

| 6,701,882 | B2 | 3/2004 | Barbezat |
| 2006/0165552 | A1* | 7/2006 | Kapoor et al. ............... 420/70 |
| 2006/0285992 | A1 | 12/2006 | Ibuki et al. |
| 2007/0284255 | A1* | 12/2007 | Gorokhovsky ....... C23C 14/024 205/89 |

FOREIGN PATENT DOCUMENTS

| DE | 102007010698 A1 | 9/2008 |
| DE | 102008034548 B3 | 10/2009 |
| DE | 102008034550 B3 | 10/2009 |
| DE | 102008034551 B3 | 10/2009 |
| EP | 1022351 A1 | 7/2000 |
| EP | 1174524 A2 | 1/2002 |
| EP | 1340834 A1 | 9/2003 |
| EP | 1757710 A1 | 2/2007 |
| GB | 1350193 A | 4/1974 |
| JP | 2005226150 A | 8/2005 |

OTHER PUBLICATIONS

Xue, Sa et al. "Research Evolution of Electric Arc Spraying Wire and its Application—The Development and Application of Arc Spraying Wire" Heat Treatment Technology and Equipment, 2008, vol. 29, No. 5, pp. 1-4 and 10 Material Science and Engineering College, Xian Shiyou University, China.

English language translation of Chinese Office Action dated Jun. 11, 2015, in Chinese Patent Application No. 201180025401.7.

* cited by examiner

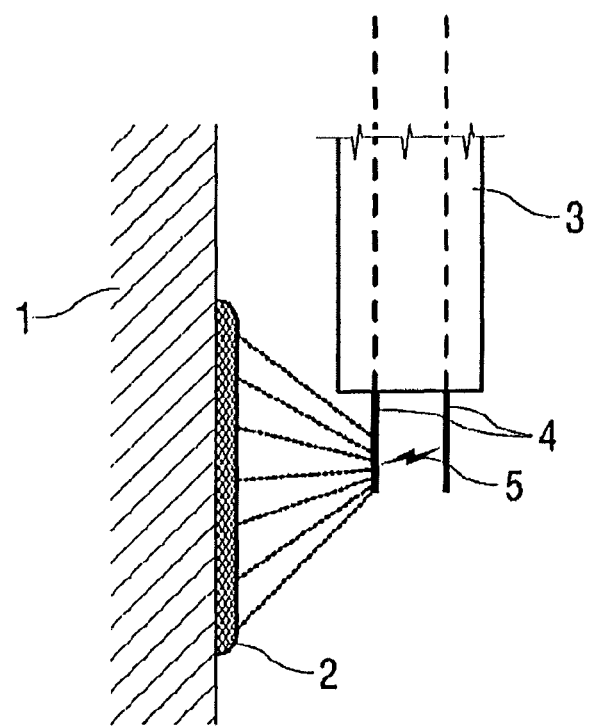

WIRE-LIKE SPRAY MATERIAL, FUNCTIONAL LAYER WHICH CAN BE PRODUCED THEREWITH AND PROCESS FOR COATING A SUBSTRATE WITH A SPRAY MATERIAL

The invention relates to a wire-form inexpensive spraying material, in particular for wire arc spraying, comprising substantially an iron/chromium alloy with 12 to 20% Cr in the wire, and also to a corrosion-resistant, dense functional layer with sufficiently great hardness and tribologically beneficial properties, which contains a minimum of 10% Cr in the layer, which can be produced therewith. The invention furthermore relates to a method for coating a substrate in which a wire-form spraying material is melted in an arc and is deposited as a layer on the substrate. The use of nitrogen as process gas causes nitrogen to be introduced into the layer, which results firstly in additional strength by virtue of interstitial hardening and secondly in the formation of wear-reducing and friction-reducing nitrides.

In the production of combustion engines, for reasons of energy efficiency and reduction of emissions it is desired to achieve as low as possible friction and high abrasion resistance and wear resistance. For this, engine components, such as for example cylinder bores or their walls, are provided with a bearing surface layer, or cylinder liners are inserted in the cylinder bores, which cylinder liners are provided with a bearing surface layer. Such bearing surface layers are mostly applied by means of thermal spraying, for example wire arc spraying. In wire arc spraying, an arc is generated between two wire-form spraying materials by applying a voltage. In the process, the wire tips melt off and are conveyed, for example by means of an atomizing gas, onto the surface which is to be coated, for example the cylinder wall, where they become attached.

A method for the production of a coating by means of wire arc spraying in which an iron alloy with 0.5 to 8% by weight boron carbide is supplied is known from DE 102007010698 A1. The iron alloy has the following composition: 0.1 to 0.7% by weight carbon; 10 to 18% by weight chromium; 0.8 to 2% by weight molybdenum; max. 2% by weight manganese and max. 1% by weight silicon. Further iron-based wire-form spraying materials are known from DE 102008034548 B3 and also from DE 102008034550 B3 and from DE 102008034551 B3.

The supplying of boron carbide permits the formation of iron boride and thus results in an increase in the layer hardness. However, this increases the process costs and adversely affects the machinability.

It is known that commercial layer systems based on low alloyed iron/carbon alloys tend to corrode, analogously to cast iron surfaces. On the other hand, chromium containing layers which have been investigated hitherto achieve the necessary hardness only by e.g. additional introduction of hard material particles such as boron carbide. This in turn required costly supplying of powder, by means of powder conveying, independent of the conveying of wire.

It is a problem of the invention to devise an improved wire-form spraying material, in particular for wire arc spraying. Target variables in this case are specific layer properties and good workability, in addition to good spraying behavior. The layer properties comprise sufficient corrosion resistance, and also adequate hardness, which should be in the range of 400 to 850 HV 0.1. Layers with these properties should be obtained without additional conveying means.

This problem is solved according to the invention by a wire-form spraying material with the features of claim 1.

Advantageous developments are the subject of the dependent claims.

A wire-form spraying material according to the invention, in particular for wire arc spraying, comprises substantially an iron/chromium alloy. The corrosion-resistant layer which it is desired to obtain requires a minimum content of 10% by weight Cr, and 0.7% by weight C. For this, the proportion of Cr and C in the spraying wire must be selected such that the evaporation of both elements during the process is served. Investigations have shown that the definition of the alloy composition of the spraying wire must take into account evaporation of up to 2% by weight Cr and up to 25% of the carbon content in the wire. For example, a minimum concentration of 10% Cr in the corrosion-free layer is associated with an initial concentration of 12 to 20% by weight Cr in the wire. For example, for 0.9% C in the layer, a concentration in the wire of a minimum of 1.2% by weight is necessary.

An additional contribution to achieving the desired layer properties is provided by the in situ alloying of the spraying substrate by introduction of nitrogen from the process gas. Regions are produced with interstitially dissolved nitrogen and incorporated nitrides, which form from the reaction of the process gas N2 with regions of the molten alloy drops during the coating operation. Both alloying processes make a considerable contribution to increasing the layer hardness and to the wear resistance. At the same time, the nitrides formed make a contribution to the reduction of friction. By deliberate setting of the volumetric flow rate of the process gases, an iron oxide content FeO<5% can be obtained in the layer. This produces compact, low-pore layers, which do not tend towards layer delamination, in contrast to oxidized layers.

An example of embodiment of the invention will be explained in greater detail below with reference to a drawing.

Therein:

FIG. 1 shows a substrate with a layer deposited by wire arc spraying.

FIG. 1 shows a substrate 1 with a layer 2 deposited by wire arc spraying (WAS). In wire arc spraying, two wire-form spraying materials 4 are supplied to a coating head 3. An arc 5 is ignited between the wire-form spraying materials 4. In the process, the wire-form spraying material 4 melts, and is applied, by means of a carrier gas, in targeted manner to the substrate 1 which is to be coated, where it cools, solidifies and forms the layer 2.

The wire-form spraying material 4 comprises substantially an iron/chromium alloy. The spraying material is formed at least with carbon as microalloy, such that predominantly martensite is produced already during cooling of the spraying material. Further, alloying constituents for the formation of wear-resistant phases and for reducing the coefficient of friction, e.g. chromium nitrides, carbides, are contained in the alloy.

The following alloying constituents in the wire are provided:

carbon 0.7% by weight to 1.2% by weight,
chromium 12% by weight to 20% by weight,
manganese 0.8% by weight to 2% by weight,
molybdenum 0.4 to 1.3% by weight and
nickel 0.01% by weight to 1% by weight,
sulfur 0.01% by weight to 0.035% by weight,
copper 0.01% by weight to 0.4% by weight.

In particular the sulfur content of the wire alloy according to the invention, which permits the formation of manganese sulfide and molybdenum sulfide, has proved advantageous with respect to wire alloys according to the prior art. Manganese sulfide improves the product property of the thermally sprayed functional layer with regard to the machinability, and molybdenum sulfide serves as a solid lubricant.

Particularly preferably, additionally one or more of the following alloying constituents are contained in the wire:
- silicon in a proportion of 0.01% by weight to 1% by weight,
- vanadium in a proportion of 0.01% by weight to 0.3% by weight,
- phosphorus in a proportion of 0.01% by weight to 0.045% by weight,
- aluminum in a proportion of at most 0.01% by weight.

The quantities specified are in percent by weight in each case relative to a total weight, if no other specifications are given.

The main constituent of the alloy is iron.

Wire arc spraying with a wire-form spraying material 4 formed from this alloy results in a particularly homogeneous functional layer 2 of reduced friction loss with low porosity and low roughness.

The wire arc sprayed functional layer 2 of reduced friction loss comprises substantially an iron base alloy with the following alloying constituents:
- carbon 0.45% by weight to 0.8% by weight,
- manganese 0.8% by weight to 2% by weight,
- molybdenum 0.4% by weight to 1.3% by weight,
- chromium ≥10% by weight and
- nickel 0.01% by weight to 1% by weight,
- sulfur 0.01% by weight to 0.035% by weight,
- copper 0.01% by weight to 0.35% by weight, in each case relative to a total weight.

Particularly preferably, additionally the following alloying constituents are contained in the functional layer 2:
- silicon in a proportion of 0.01% by weight to 1% by weight,
- vanadium in a proportion of 0.01% by weight to 0.3% by weight,
- phosphorus in a proportion of 0.01% by weight to 0.045% by weight,
- aluminum in a proportion of at most 0.01% by weight, in each case relative to a total weight.

Also preferably, the functional layer 2 has interstitially dissolved iron nitrides and chromium nitrides, the nitrogen atom of the alloy having a proportion of 0.01 to 2% by weight relative to a total weight.

The nitrogen improves the homogeneity and fine-grained structure of the functional layer 2. The iron nitrides and chromium nitrides ensure the layer hardness and wear resistance of the functional layer 2 while at the same time high corrosion resistance is provided.

The functional layer 2 according to the invention is distinguished particularly by a high resistance to diesel fuel with a high sulfur content of 500 up to 1000 ppm, whereas functional layers according to the prior art rapidly corrode upon contact with such fuel.

According to the invention, the coating of the substrate 1 takes place in that the wire-form spraying material 4 according to the invention is melted in an arc 5 and is deposited as a functional layer 2 on the substrate 1, with nitrogen being used as process gas. The use of nitrogen as process gas brings about the formation and inclusion of interstitially dissolved iron nitrides and chromium nitrides in the functional layer 2. At the same time, the formation of iron oxides is suppressed: these would impair the layer properties, in particular increase the porosity, impair the machinability and produce cohesive weak points which cause layer spalling.

The melting of the wire-form spraying material 4 in the arc 5 preferably takes place at a melting power of at least 9000 W, in particular with a current intensity of at least 250 A and/or a voltage of at least 36 V. As a result, upon melting very fine particles are produced, which in turn permit the formation of very dense layered structures.

In order to keep the extraction of the very fine particles by the plant extraction system as low as possible, it is advantageous to make the particle jet rapid (high airborne velocity). This can be done by using a Laval nozzle, which is described e.g. in DE 102008004607 A1.

The wire-form spraying material 4 is advantageously conveyed at a speed of at most 12 m/s and the jet of melted particles is extracted at a speed of at most 20 m/s. These parameter limits ensure the formation of preferred layered structures without considerable alloying constituents being extracted, or evaporating off.

Furthermore, it is advantageous to generate residual compressive stresses of the functional layer 2 by temperature control in the heating oven or by local inductive heating, since these improve the adhesion of the functional layer 2 to the substrate 1.

LIST OF REFERENCE NUMERALS 1 substrate
2 layer
3 coating head
4 wire-form spraying material
5 arc

The invention claimed is:

1. An arc sprayed functional layer (2) of reduced friction, wherein said functional layer is formed by arc wire spraying of a wire-form spraying material (4) formed at least with carbon as microalloy such that upon solidification of the spraying material a functional layer (2) having a hardness in the range of 400 to 850 HV 0.1 is produced, the following alloying constituents being provided in the wire-form spraying material:
  carbon 0.7% by weight to 1.2% by weight,
  chromium 12% by weight to 20% by weight,
  manganese 0.8% by weight to 2% by weight,
  molybdenum 0.4 to 1.3% by weight,
  nickel 0.01% by weight to 1% by weight,
  sulfur 0.01% by weight to 0.035% by weight,
  copper 0.01% by weight to 0.4% by weight,
and optionally:
  silicon 0.01% by weight to 1% by weight,
  vanadium 0.01% by weight to 0.3% by weight,
  phosphorus 0.01% by weight to 0.045% by weight,
  aluminum at most 0.01% by weight,
and the remainder iron and unavoidable impurities in each case relative to a total weight.

2. An arc sprayed functional layer (2) of reduced friction, produced from a spraying material, the functional layer (2) having a hardness in the range of 400 to 850 HV 0.1 and comprising the following alloying constituents:
  carbon 0.45% by weight to 0.8% by weight,
  manganese 0.8 to 2% by weight,
  molybdenum 0.4 to 1.3% by weight,
  chromium ≥10% by weight,
  nickel 0.01% by weight to 1% by weight,
  sulfur 0.01% by weight to 0.035% by weight,
  copper 0.01% by weight to 0.35% by weight, and optionally:
- silicon 0.01% by weight to 1% by weight,
- vanadium 0.01% by weight to 0.3% by weight,
- phosphorus 0.01% by weight to 0.045% by weight,
- aluminum at most 0.01% by weight, and the remainder iron and unavoidable impurities in each case relative to a total weight.

3. The functional layer (2) as claimed in claim 2, wherein the functional layer (2) has interstitially dissolved iron nitrides and chromium nitrides, the nitrogen portion of the alloy being a proportion of 0.01 to 2% by weight relative to a total weight.

4. The functional layer (2) as claimed in claim 2, produced by melting a wire-form spraying material (4) formed at least with carbon as microalloy such that upon solidification of the spraying material a functional layer (2) having a hardness in the range of 400 to 850 HV 0.1 is produced, the following alloying constituents being provided in the wire-form spraying material (4):
- carbon 0.7% by weight to 1.2% by weight,
- chromium 12% by weight to 20% by weight,
- manganese 0.8% by weight to 2% by weight,
- molybdenum 0.4 to 1.3% by weight,
- nickel 0.01% by weight to 1% by weight,
- sulfur 0.01% by weight to 0.035% by weight,
- copper 0.01% by weight to 0.4% by weight, and optionally:
- silicon 0.01% by weight to 1% by weight,
- vanadium 0.01% by weight to 0.3% by weight,
- phosphorus 0.01% by weight to 0.045% by weight,
- aluminum at most 0.01% by weight, and the remainder iron and unavoidable impurities in each case relative to a total weight in an arc (5) and depositing the melt as a functional layer (2) on a substrate (1), with nitrogen being used as process gas.

5. The functional layer (2) as claimed in claim 4, wherein the wire-form spraying material (4) is melted in the arc at a melting power of at least 9000 W.

6. The functional layer (2) as claimed in claim 4, wherein the wire-form spraying material (4) is conveyed at a speed of at most 12 m/s and sprayed to form a jet of melted particles, wherein the jet of melted particles is sprayed at a speed of at most 20 m/s.

7. The functional layer (2) as claimed in claim 4, wherein residual compressive stresses are generated in the functional layer (2) by temperature control in a heating oven or by local inductive heating.

8. The functional layer (2) as claimed in claim 4, wherein the wire-form spraying material (4) is melted in the arc at a melting power of at least 9000 W with a current intensity of at least 250 A and/or a voltage of at least 36 V.

* * * * *